(No Model.) 8 Sheets—Sheet 1.
A. O. CARMAN.
GRAIN BINDING HARVESTER.
No. 339,144. Patented Apr. 6, 1886.
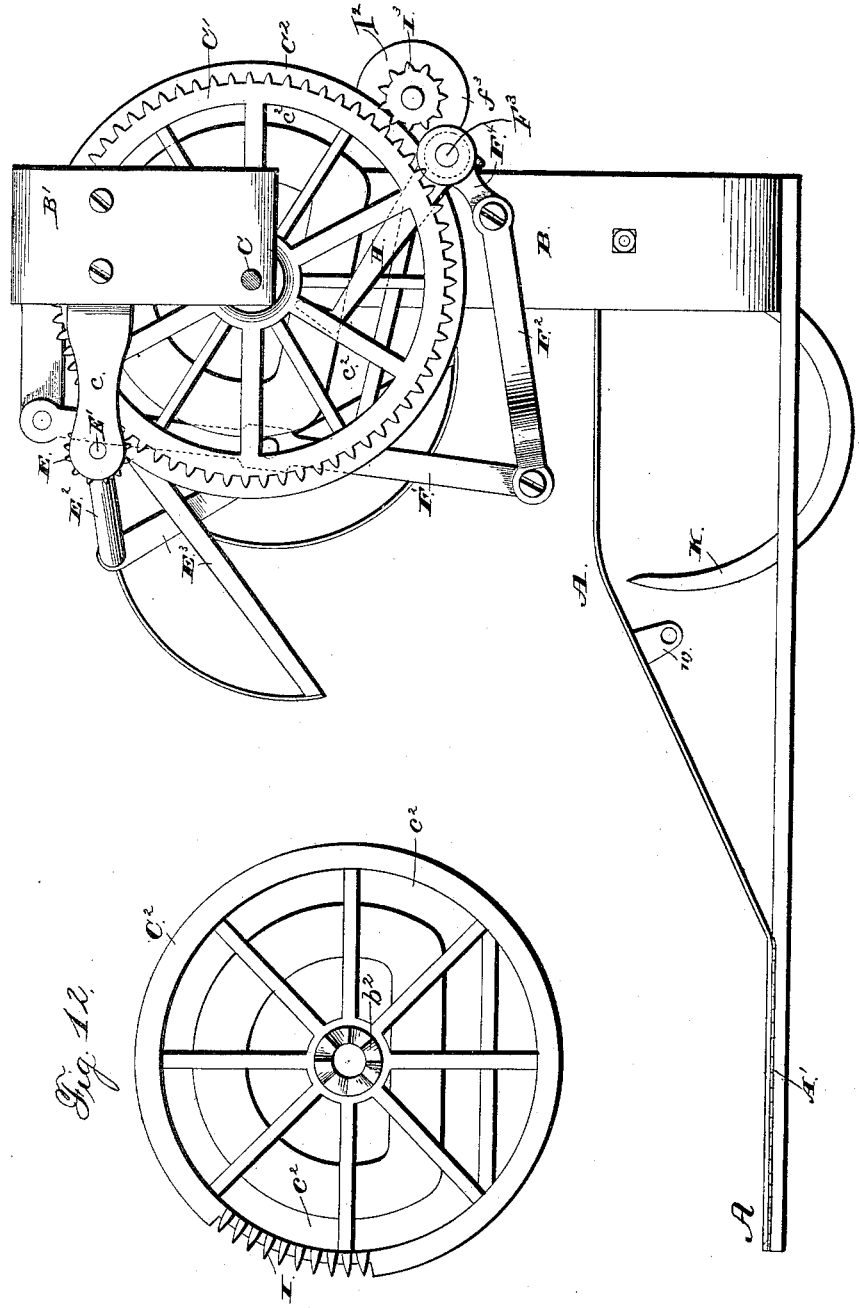
WITNESSES
Jas. E. Hutchinson
Geo. F. Downing
INVENTOR
Alvin O. Carman,
By H. A. Seymour
Attorney
N. PETERS, Photo-Lithographer, Washington, D. C.

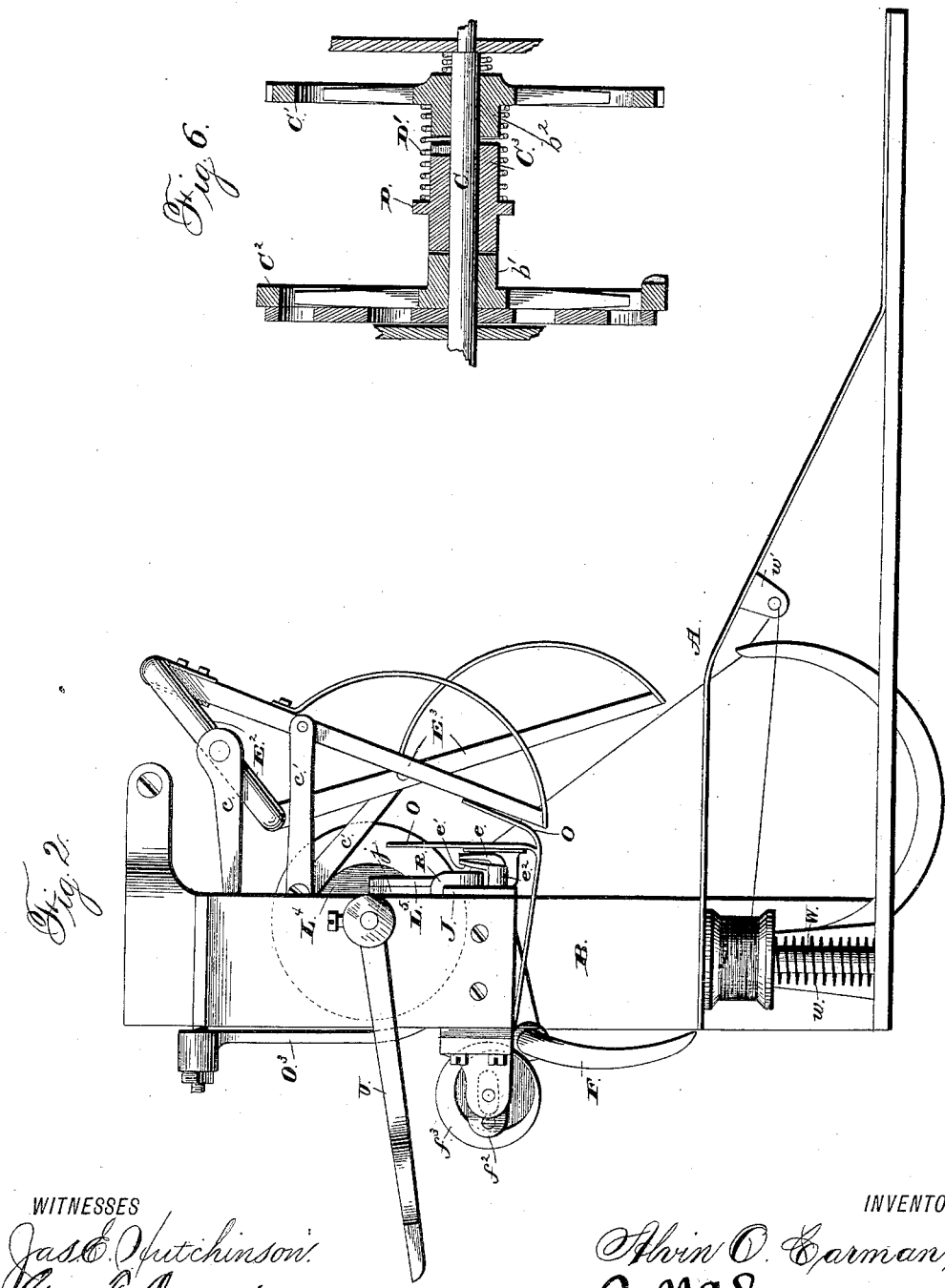

(No Model.)
8 Sheets—Sheet 3.
A. O. CARMAN.
GRAIN BINDING HARVESTER.
No. 339,144. Patented Apr. 6, 1886.
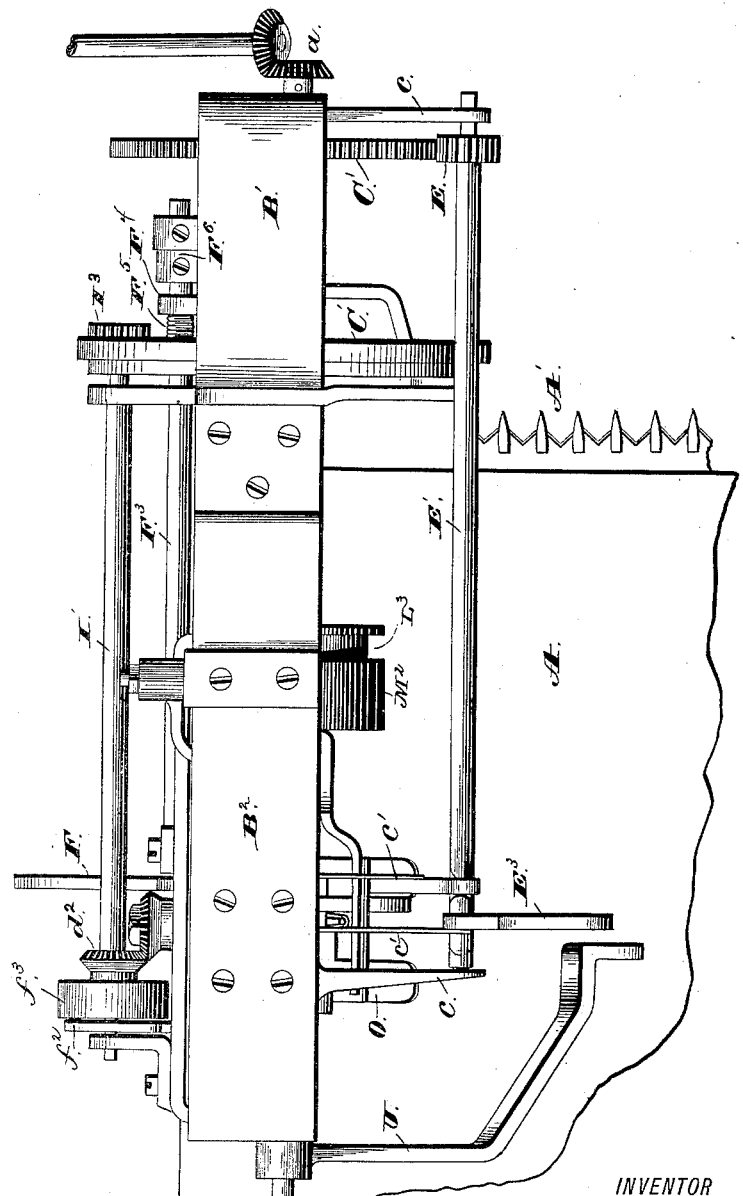
WITNESSES
Jas. E. Hutchinson.
A. W. Bright.
INVENTOR
Alvin O. Carman
By H. A. Seymour
Attorney (No Model.)  8 Sheets—Sheet 4.
A. O. CARMAN.
GRAIN BINDING HARVESTER.
No. 339,144.  Patented Apr. 6, 1886.
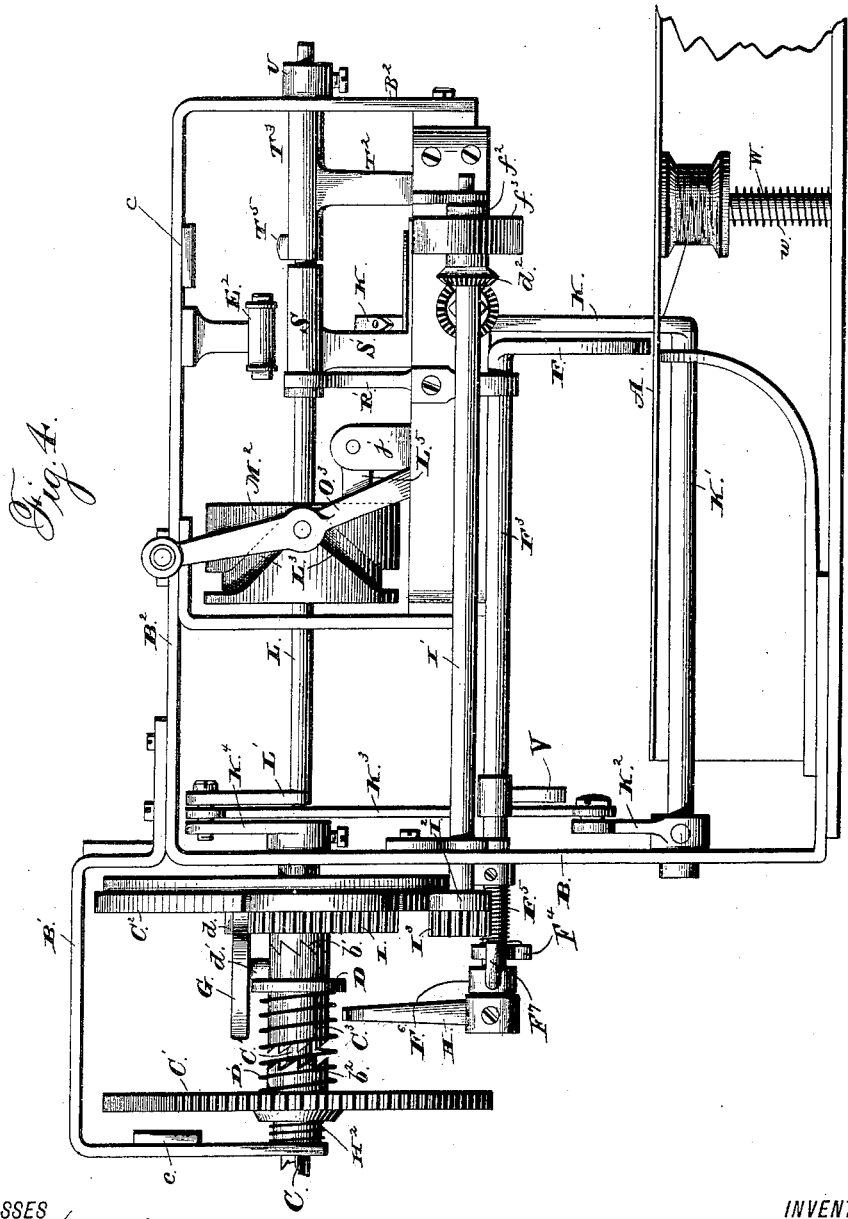
WITNESSES  INVENTOR
Jas. E. Hutchinson.  Alvin O. Carman,
Geo. F. Downing.  By H. A. Symmon
  Attorney (No Model.) 8 Sheets—Sheet 5.
A. O. CARMAN.
GRAIN BINDING HARVESTER.
No. 339,144. Patented Apr. 6, 1886.
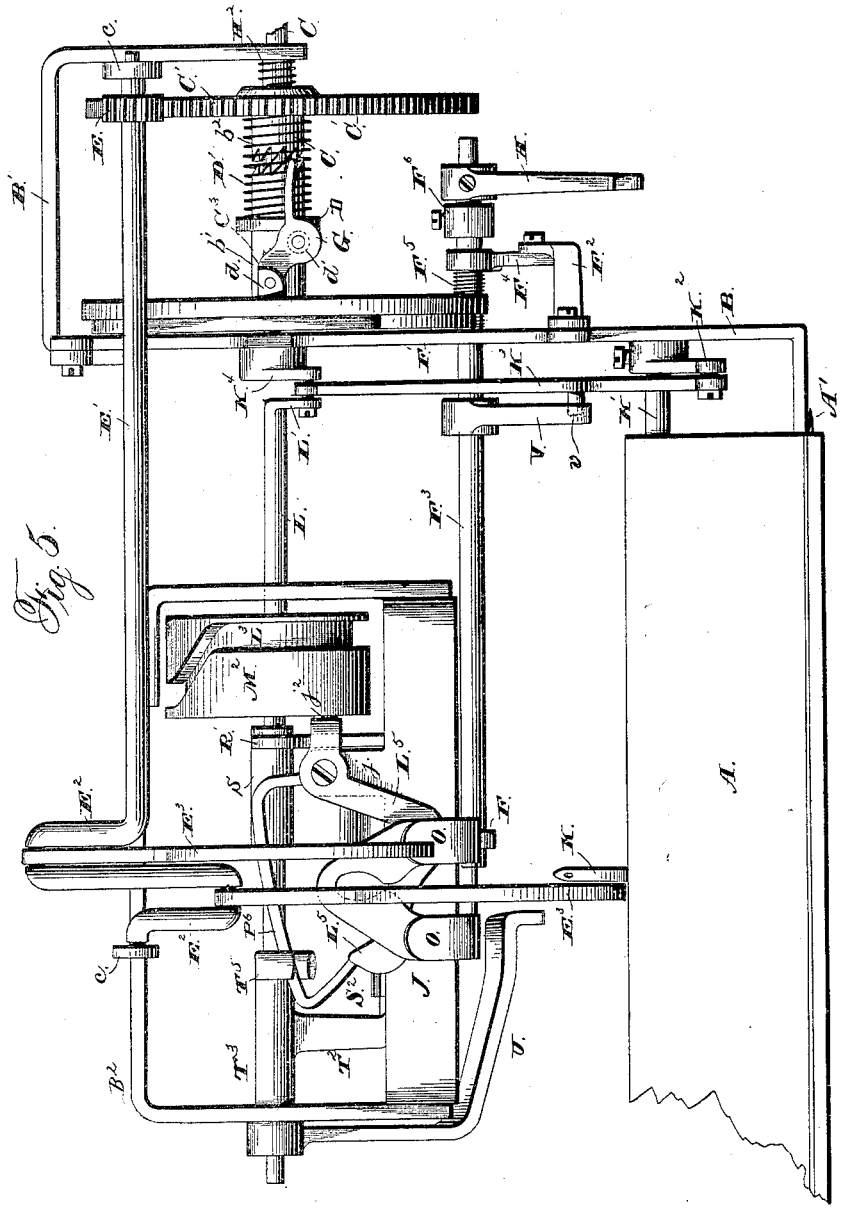
WITNESSES
Jas. E. Hutchinson
Geo. F. Downing
INVENTOR
Alvin O. Carman,
By H. A. Seymour, Attorney (No Model.) 8 Sheets—Sheet 6.
A. O. CARMAN.
GRAIN BINDING HARVESTER.
No. 339,144. Patented Apr. 6, 1886.
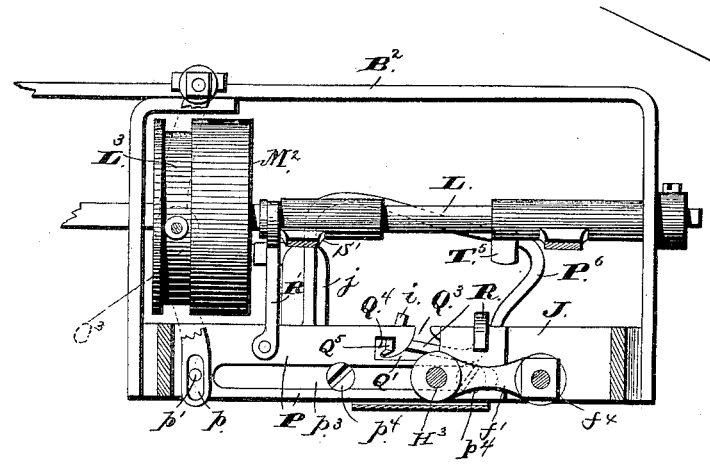
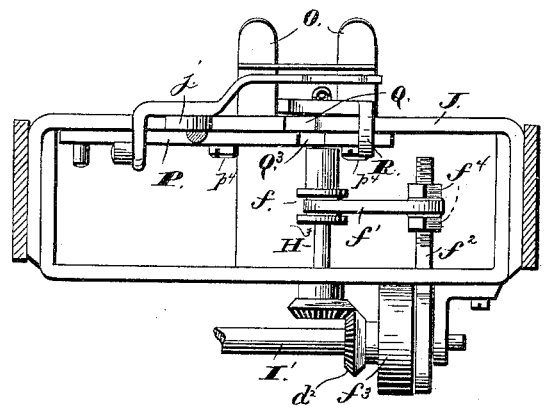
Fig. 7.
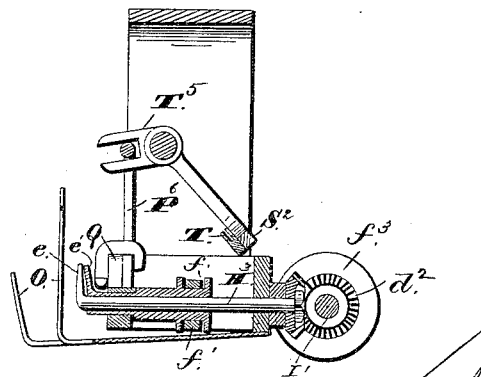
WITNESSES
Jas. E. Hutchinson
A. W. Bright
INVENTOR
Alvin O. Carman
By H. A. Lupmon
Attorney (No Model.)  8 Sheets—Sheet 7.

A. O. CARMAN.
GRAIN BINDING HARVESTER.

No. 339,144.  Patented Apr. 6, 1886.

WITNESSES
Jas. E. Hutchinson.
A. W. Bright.

INVENTOR
Alvin O. Carman
By H. A. Seymour,
Attorney.

N. PETERS. Photo-Lithographer, Washington, D. C.

(No Model.) 8 Sheets—Sheet 8.

A. O. CARMAN.
GRAIN BINDING HARVESTER.

No. 339,144. Patented Apr. 6, 1886.

WITNESSES
INVENTOR
Alvin O. Carman
Attorney

UNITED STATES PATENT OFFICE.

ALVIN O. CARMAN, OF POTTERVILLE, MICHIGAN.

GRAIN-BINDING HARVESTER.

SPECIFICATION forming part of Letters Patent No. 339,144, dated April 6, 1886.

Application filed April 9, 1884. Serial No. 127,251. (No model.)

*To all whom it may concern:*

Be it known that I, ALVIN O. CARMAN, of Potterville, in the county of Eaton and State of Michigan, have invented certain new and useful Improvements in Grain-Binding Harvesters; and I do hereby declare the following to be a full, clear, and exact description of the invention, such as will enable others skilled in the art to which it appertains to make and use the same.

My invention relates to an improvement in grain-binding harvesters; and it consists in the parts and combinations of parts, as will be fully described, and pointed out in the claims.

Figure 8:
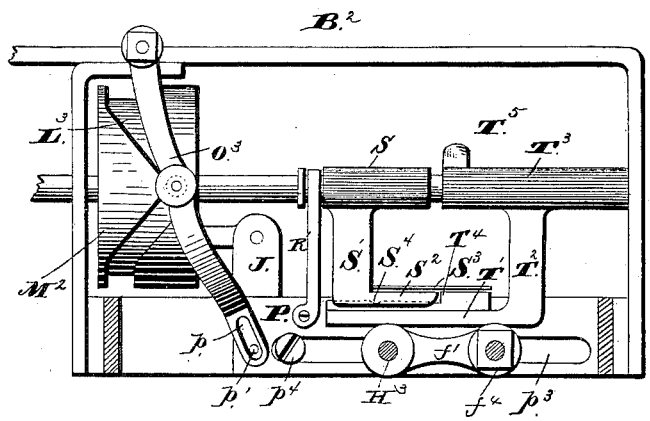
Figure 9:
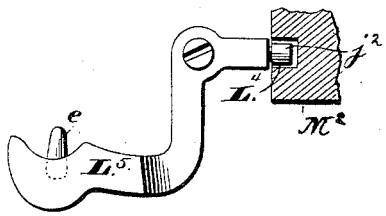
Figure 10:
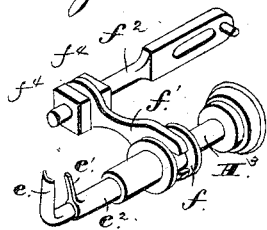
Figure 11:
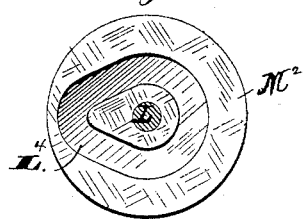
Figure 13:
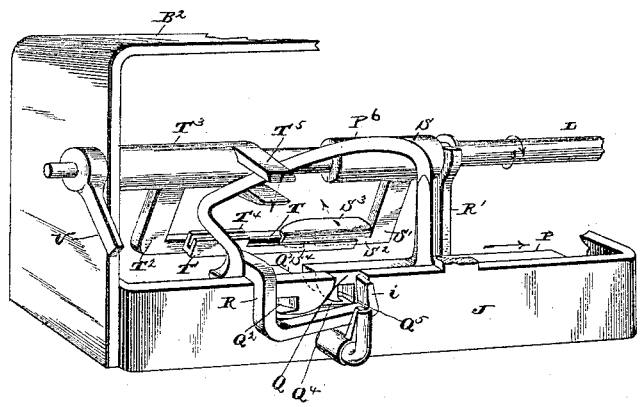
Figure 15:
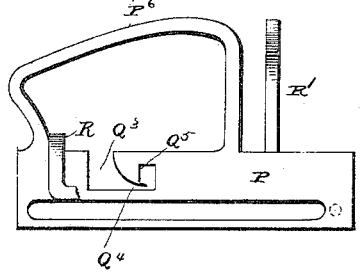
Figure 14:
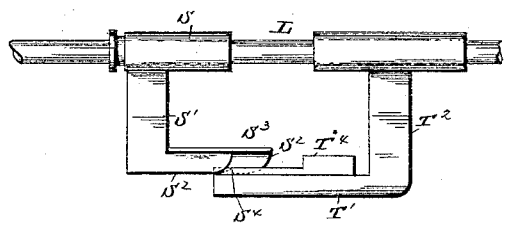

In the accompanying drawings, Figures 1 and 2 are views in end elevation of the platform with the binder attachment thereto, the wheels and driving mechanism being removed. Fig. 3 is a plan view of the same. Fig. 4 is a view in side elevation. Fig. 5 is a view in elevation of the opposite or grain side of the machine. Fig. 6 is a vertical central sectional view of the driving gear-wheel, the cam and mutilated gear-wheel, and the intermediate sleeve. Fig. 7 shows detached views, partly in section and partly in elevation, of the cord cutting, holding, and tying mechanism. Fig. 8 is a detached view of the cord-holding mechanism and adjacent parts, the holding-jaw being shown in closed position. Fig. 9 is a side elevation of the stripping-lever and the end of the tyer, a portion of the cam-wheel which operates the stripping-lever being shown in section. Fig. 10 is a perspective view of the tying-bill and devices for operating the movable jaw of the same. Fig. 11 is a view in elevation of the cam-wheel which operates the cord holding and cutting mechanism and the arm for withdrawing the cord from between the jaws. Fig. 12 is a side elevation of the combined cam and mutilated gear-wheel. Fig. 13 is a view in perspective of the cord holding and cutting mechanism. Fig. 14 is a view in elevation of the holding-jaws, and Fig. 15 is a similar view of the plate P.

A represents a harvester-platform provided at its front edge with the cutters A', which latter can be driven directly from the ground or master wheel of the harvester or from the main shaft which operates the binding mechanism. An endless rake or carrier can be located on the grain-receiving platform for the purpose of delivering the grain to the binding mechanism, and the end of said platform near the ground or master wheel (not shown) is preferably inclined upwardly slightly, to enable the needle to rest under the same without coming in contact with the ground. This platform can be built in any substantial manner, and supports near the front end the foot of the standard B, which latter is rigidly secured thereto. This standard projects upwardly a distance above the platform, and is provided at its upper end with the frames B' B², which latter project therefrom in opposite directions, so as to counterbalance each other. The forwardly-projecting frame B' is provided at its lower depending end with a bearing, which latter, together with a bearing in the standard B, supports the main driving-shaft C. This shaft is provided at its outer end with a small bevel-wheel, which is driven by a gear-wheel (not shown) driven indirectly by the master-wheel.

The shaft C, when the machine is in operation, is constantly revolving, and is provided with the gear-wheel C' and the combined cam and mutilated gear-wheel C². These wheels are free to revolve on the shaft independently thereof, and one is adapted for operating the packers, while the other imparts the necessary movements to the knot-tying and cord cutting and holding mechanism. The wheels C² and C' are loose on the shaft C, and are separated by the sleeve C³, which latter is free to move longitudinally on the main shaft, but is locked against independent rotary movement by means of a feather and groove.

The sleeve C³ is provided on opposite ends with ratchet-teeth b, which latter engage, respectively, the correspondingly-toothed hubs b' of the wheel C² and b² of the wheel C'. This sleeve is not long enough to engage both hubs at the same time, and hence when one of the said wheels is in engagement with the sleeve the other wheel is idle. This sleeve is provided at or near its center with a collar, D, against the outer face of which one end of the spiral spring D' bears. The opposite end of this spring bears against the inner face of the pinion C', and the tendency thereof is to hold the sleeve in contact with the wheel C², which latter moves the binding mechanism; but this tendency is overcome by mechanism, to be hereinafter described, which automatically shifts the sleeve over into contact with the wheel C' and holds it until the pressure of the grain against the compressor-arm is sufficient to release it. When the sleeve is in contact with the wheel C', the binding mechanism is at rest and the packers are in motion. The wheel C' is an ordinary gear-wheel, and meshes with the pinion E, rigidly secured to the packer-shaft E'. This shaft is journaled at opposite ends in arm c of the frames B' B², and is provided at its rear end with double cranks E², to which the upper ends of the packers E³ are loosely journaled. These packers E³ are connected to the frame B² below their pivotal attachment by the links c', which latter guide the packers in their movements. Each packer-finger E³ consists, essentially, of a straight bar, provided on its front face with a curved bow, which latter prevents the needle from being wedged in between the packers in case it should pick up any grain. If these fingers had straight faces and the needle should bring up any grain, the needle would in all probability be wedged in between the packers and retard the movements, and possibly disarrange some of the parts; but by providing the packers with the bows or guards the grain as it is brought up by the needle strikes against these curved guards and is moved thereon either down past the point of the packers or up over the needle and allowed to fall down behind the needle. These packers or fingers are situated, preferably, on oppositely-disposed cranks, so as to enable them to operate alternately, and their movements are such as to cause them to take the grain from the conveyer (not shown) and deliver it against the compressor-arm, which will be described further on. Thus it will be seen that the packers are operated by the wheel C', while the binding mechanism is operated by the wheel C², and when the packers are idle the binding mechanism is in motion, thereby throwing all the power into the binder, and when the binding mechanism is not at work all the power is transferred to the packers, thereby equalizing the draft of the team. The packers take the grain and move it along the platform until it is stopped by the compressor-arm F. As soon as the pressure against the compressor F is sufficient to move it outward, the sleeve C³ is automatically moved from engagement with the wheel C' to the wheel C², and the binding mechanism begins its operation, as shown in another application filed by me, Serial No. 103,822.

The wheel C² is a combined cam and mutilated gear-wheel, and is provided on its rear side face with a cam-groove, c², preferably shaped substantially as shown, and adapted to operate the compressor-arm F, which latter is rigidly secured to the horizontal shaft F³, journaled in bearings formed on the standard B and frame B².

F' is a lever pivotally secured at its upper end to a laterally-projecting arm of the standard B, and provided a little to one side of its center with a forwardly-projecting lug, which latter rests within the cam-slot c² of the wheel C². The greater portion of the slot c² is concentric with the axis of the wheel C², while the lesser portion is eccentric thereto, and running nearly in a straight line across the wheel, for the purpose of imparting to the lever F' a single vibration back and forth. When the lug of the lever F' rests within the concentric portion of the slot, the lever is held stationary; but as soon as it enters the eccentric portion of the slot it begins to swing toward the stubble side of the platform, and then returns to its normal position, where it remains until the wheel makes another revolution. To the lower end of the lever F' is pivotally attached one end of the pitman F², the opposite end of the said pitman being attached to the crank F⁴, loosely hung on the horizontal shaft F³. This shaft alongside of the crank F⁴ is embraced by the small spiral spring F⁵, one end of which is rigidly secured to the shaft, while the opposite end is secured to the crank. The tendency of this spring is to hold the compressor-arm in a vertical position, and allows the compressor-arm and its shaft to move slightly without turning the crank. This shaft is provided alongside of the crank with the sleeve F⁶, having a rearwardly-projecting finger, F⁷, which latter rests across the line of movement of the crank F⁴, and forms an abutment therefor. When the compressor-arm is in a vertical position, this finger rests up in close contact with the crank and prevents the latter from moving independently of the shaft, but allows the latter to move independently of the crank. This is necessary to enable the shaft carrying the compressor to turn slightly when the pressure of the grain against the compressor-arm is sufficient to trip the packers and start the binding mechanism. As soon, however, as the pressure against the compressor-arm is relieved, the compressor-arm shaft is turned by the spring until the finger of the sleeve F⁶ strikes the crank.

The wheel C² is provided on its front face, near its axis, with a projecting lug forming the bearing d, in which the lever G is pivotally secured. This lever is provided at or near its center and to the rear of the collar D of the sleeve C³ with a pin, d', having an anti-friction roller thereon, which latter bears against the inner face of the collar D. The outer free end of the lever G is adapted to engage the trip-bar H, which latter is rigidly secured to the front end of the compressor-shaft F³. This trip finger or arm is bent as shown, and the upper free end thereof is adapted to rest in close proximity to the sleeve C³ on the main shaft. The lever G necessarily moves with the wheel C², and is in line with the free end of the trip-arm. Suppose, for the sake of illustration, that the packers have packed sufficient grain against the compressor-arm to trip the latter. This arm then moves outwardly to a horizontal position, and consequently moves the trip-arm away from sleeve C³ and out of the path of the lever G. Now, as soon as the bundle is ejected the spring before referred to causes the compressor-arm to resume its vertical position, and also causes the trip-arm H to rise up under the sleeve $C^3$. While this trip-arm was depressed, the lever G passed around and made one complete revolution around the main shaft, during which time the bundle has been tied, and again comes up to the end of the trip-arm, which latter prevents the further movement of the lever, and also of the wheel to which is attached. The pressure of the lever against the trip-arm causes the anti-friction roller on the former to bear against the sleeve $C^3$ with sufficient force to slide the latter longitudinally until the teeth on one end thereof engage the wheel $C'$. This starts the packers, which pack the grain against the compressor-arm. When sufficient grain is packed thereagainst, the compressor-arm is elevated and the trip-arm is depressed, which leaves the lever G free to rotate. The spring encircling the sleeve $C^3$ then forces the latter over into contact with the wheel $C^2$, which then takes up the motion and binds the grain deposited by the packers. A spring, $H^2$, encircles the shaft C between the front end of the frame B and the wheel $C'$, for the purpose of enabling the latter to move longitudinally on the shaft. When the sleeve is being moved from one hub to the other, there is a possibility of the sleeve engaging the tips of the teeth of both hubs and becoming wedged therein. If such an accident should occur, the spring $H^2$ would permit the wheel $C'$ to move laterally and relieve the sleeve.

The combined cam and segmental gear-wheel $C^2$ is provided with teeth I, with which the pinion $I^3$ on the binder-shaft $I'$ meshes. These teeth are the same in number as the pinion-teeth, so as to turn the latter once at each revolution of the wheel $C^2$, and are located on a projecting flange on one side of the wheel, so as to enable the delay-shoe $I^2$, rigidly secured to the shaft $I'$, immediately behind the pinion $I^3$, to engage the periphery of the wheel, for the purpose of preventing the shaft $I'$ from turning, excepting when the teeth of the pinion $I^3$ are in engagement with the teeth on the combined cam and segmental gear-wheel. The portion of the periphery of the wheel $C^2$ immediately behind the teeth is cut away, to enable the shoe to revolve without interference. This delay-shoe is provided with a curved portion, which latter is so turned as to come in contact with the periphery of the wheel $C^2$ just as the pinion $I^3$ leaves the gear-segment I, and prevent the pinion $I^3$ from turning until the wheel $C^2$ has made another complete revolution. The shaft $I'$ is journaled in bearings formed in the standard B and frame $B^2$, and is provided near its rear end with a small bevel-wheel, $d^2$, which latter meshes with a similar wheel rigidly secured to the outer end of the horizontal shaft $H^3$. The horizontal shaft $H^3$ is the shaft of the tying-bill, and is journaled in the lower portion of the frame $B^2$ in the same vertical plane with the needle, and is provided on its end with an integral jaw, $e$, which latter operates with the jaw $e'$, formed integral with the sleeve $e^2$, encircling the greater portion of the shaft $H^3$. The jaw $e$ of the tying-bill is adapted to partly overlap the jaw $e'$, for the purpose of preventing the cord from slipping, and the sleeve $e^2$, to which the jaw $e'$ is secured, is prevented from rotating independently of the shaft $H^3$ by means of a feather and groove. The shaft $I'$ only revolves once at each revolution of the wheel $C^2$, and hence the tying-bill is only operated once at each revolution. The sleeve $e^2$ is provided at its rear end with a grooved collar, $f$, in which the bifurcated end of the arm $f'$ rests. This arm $f'$ is adjustably secured to the one end of the rod $f^2$, while the opposite end of the rod is provided with a projecting lug, which latter rests within a cam-groove formed in the wheel $f^3$, rigidly secured to the rear end of the shaft $I'$. This rod $f^2$ is provided with a slot, through which the shaft $I'$ passes, the said slot being sufficiently long to enable the rod to move longitudinally a sufficient distance without coming in contact with the said shaft. The arm $f'$ is adjustably secured to the rod $f^2$ by nuts $f^4$, screwed upon the rod on opposite sides of the arm. By loosening the nuts the arm can be so adjusted as to lengthen or shorten the longitudinal movement of the sleeve $e^2$. These parts are all adjusted to operate at the proper moment, and during the revolution of the tying-bill shaft the rod $f^2$ is moved longitudinally in one direction, which separates the jaws of the tying-bill sufficiently for the cord to enter between them, after which they are immediately closed by the return movement of the rod. The jaws of the tying-bill rest outside of the frame of the face-plate J of the frame $B^2$ in such a position as to be within easy reach of the cord as the latter is brought up by the needle or binder arm. This needle or binder arm K is curved, substantially as shown, and is rigidly secured to the shaft $K'$, journaled to the machine-frame below the platform. This shaft is provided at its front end with an arm, $K^2$, to which the lower end of the pitman $K^3$ is pivotally secured, the upper end of this pitman being secured to the crank $K^4$, which latter is rigidly secured to the hub of the wheel $C^2$.

On a line with the shaft C and journaled in the frame $B^2$ is situated the shaft L. This shaft is provided at its front end with a crank, $L'$, which latter is connected to the wrist-pin that connects the pitman $K^3$ with the crank $K^4$, and is also provided with cam-wheel $M^2$, which latter is provided on its periphery with a cam-groove, $L^3$, by means of which the cord holding and cutting mechanisms are operated, and on its rear side face with the cam-groove $L^4$, which latter operates the stripper $L^5$. This stripper $L^5$ resembles a bell-crank lever in form, and is pivoted to the outwardly-extending arm $j$ of the face-plate J. The front end of this arm $L^5$ is provided with an anti-friction roller, $j^2$, which latter moves within the cam-groove $L^4$ of the cam-wheel $M^2$. This groove is so shaped as to give the arm $L^5$ a single vibratory movement at each revolution of the wheel. The rear or horizontal portion of this arm rests in a plane slightly outside of the jaws of the tying-bill, and when in its normal position rests below the said jaws, so as to enable the latter to engage the cord as it is brought up by the needle or binder arm. After the cord has been carried around the bundle and the knot formed by the tying-bill, the ends of the cord around the bundle are severed from the main body of the cord, leaving the bundle held by the tying-bill. Just at this juncture the rear or horizontal portion of the stripper $L^5$ rests below the tying-bill, and, engaging the cord between the bundle and the tying-bill, forcibly withdraws the cord from between said jaws and leaves the bundle free to be ejected. These jaws of the bill, cord-stripping arm, and the cord cutting and holding mechanism are protected from the straw by the breast-plate O, which latter prevents the straw from rising up below the lower edge of the frame $B^2$. One end of this plate is turned up to protect the tying-bill, the said upturned edge being provided with an elongated open slot for the passage of the needle and the cord. The cam-wheel $M^2$ is, as before stated, provided with the peripheral groove $L^3$, which latter operates the cord holding and cutting mechanism through the intervention of the lever $O^3$. This lever is pivoted at its upper end to the frame $B^2$, and provided centrally with a stud having an anti-friction roller thereon, which latter moves in the cam-groove $L^3$, while the extreme lower end thereof is provided with a slot, $p$, in which the stud $p'$, rigidly secured to the sliding plate P, rests. This plate P is situated directly under the cam-wheel, and moves longitudinally against the lower face of the face-plate J of the frame $B^2$. This plate P is provided near its lower end with a longitudinal slot, $p^3$, through which the bolts $p^4$, which secure the said plate P to the face-plate J and the shaft $H^3$ and sleeve $e^2$, encircling the said shaft, pass. This longitudinal slot $p^3$ allows the plate P to slide longitudinally without interfering in the least with the movements of the tying-bill. The face-plate J is provided with the open slot Q, which latter is in line with the needle and tying-bill. This slot opens upwardly, to enable the cord to drop therein, and has a rearward extension, Q', through which the cord is led to the cutter $Q^2$. The plate P is also provided with a slot, $Q^3$, opening upwardly and registering with the slot Q of the plate J. This slot $Q^3$ has a forward extension, $Q^4$, through which the cord passes to the cutter $Q^5$. The slots Q' and $Q^4$ are in the same horizontal plane, so as to enable the cord to pass the cutters without being wedged or cut. The plate P is provided near its rear end with the cord-guiding arm R, which latter partly overlaps the plate J, and then projects forwardly and is provided with an upwardly-projecting end, $i$, which latter terminates slightly above the plates P and J. When the slots Q and $Q^3$ of the plates J and P are together and in a line with the tying-bill, the end $i$ of the arm R rests in front of the said slots and tying-bill and in front of the cord, and as the cord rests in front of the tying-bill it follows that as the plate P and arm R are moved backward the cord is carried against the jaws of the tying-bill and held in contact therewith as long as the plate P remains stationary, and hence the cord is in a position to be grasped by said jaws as they revolve. The plate P is provided near its front end with the upwardly-extending arm R', provided with the bifurcated upper end, which latter rests within an annular groove formed in the front end of the sliding sleeve S. This sleeve S has a free swinging movement and a longitudinal movement on the shaft L, and is provided with the depending arm S', to which the movable cord-holding plate $S^2$ is rigidly secured. This plate is provided with a laterally-projecting flange, $S^3$, which latter guides the cord in its movements, and prevents the cord from coming in contact with the flat face of the plate $S^2$, which would tend to retard the free movement of the cord. The lower rear edge of the plate $S^2$ is provided with a hook, $S^4$, with which the cord engages, and by which the free end of the cord is held. The lower edge of this plate $S^2$ runs in a groove, T, formed in the plate T', rigidly secured by the arm $T^2$ to the oscillating but non-sliding sleeve $T^3$, loosely mounted on the shaft L. This plate T' is provided near its rear end with an abutment, $T^4$, against which the cord strikes, and which holds the cord while the hook $S^4$ passes over the same. The inner end of the plate $S^2$ is curved upwardly, to enable it, when moving toward the arm $T^2$, to freely pass over the cord without engaging or cutting said cord. The sleeve $T^3$ is provided with the laterally-projecting bifurcated lug $T^5$, which latter partly embraces the guiding-bar $P^6$, rigidly secured at its opposite ends to the plate P. The portion of this bar over which the bifurcated lug $T^5$ moves inclines downwardly toward the rear end of the machine, and as the plate P is moved rearwardly the plates $S^2$ and T' are swung laterally away from the plate P. The hook $S^4$ of the plate $S^2$ always rests within the groove of the plate T', and hence when the latter plate is moved laterally the plate $S^2$ also moves in the same direction simultaneously therewith.

The shaft L is provided at its extreme rear end with the ejecting-arm U, which latter is so curved that its free end comes at or about the longitudinal center of the bundle. This arm is rigidly secured to the shaft L, and consequently revolves therewith, and is so adjusted as to come in contact with the bundle just after the latter is bound. The tendency of the grain while being packed against the yielding compressor-arm is to force the latter outwardly; but the tendency is opposed by the arm V, rigidly secured to the compressor-arm shaft, coming in contact with the rearwardly-projecting lug $v$ of the pitman $K^3$. The lug and arm are arranged to permit of sufficient movement of the compressor-arm to start the binding mechanism, and after the binding mechanism has been started the lug $v$ is moved into contact with the arm V and forces the compressor-arm a short distance toward the grain being bound and holds it snugly in contact with the binder-arm. The lug $v$ then passes off beyond the end of the arm and leaves the compressor-arm free to ascend and permit of the escape of the bundle. The arm V rests in the line of movement of the lug on the pitman, and when the latter is moving upwardly this lug strikes the arm V, and consequently moves the compressor-arm inwardly toward the grain and assists materially in packing the grain, and then passes off or around the end of the arm V and leaves the compressor-arm free to be moved upwardly by the grain.

W is a post secured to the frame of the machine, under the platform, and adapted to receive and hold the spool or ball of cord. The spool or ball is held up in contact with the lower side of the platform by the spring $w$, which latter produces sufficient friction to prevent the cord from unwinding unnecessarily, and, in fact, regulates the tension of the cord. The free end of the cord is first carried through the eye $w'$ on the under side of the platform, and then through one or more loops on the convex side of the needle, and finally through the eye of the needle. Sufficient cord is then drawn from the spool and the free end thereof secured under the hooked end $S^4$ of the plate $S^2$, and the machine is ready for binding.

The operation of my machine is as follows: At the commencement of the operation the compressor-arm is in a vertical position and the sliding sleeve in engagement with the drive-wheel which operates the packers. After the packers have packed sufficient grain against the compressor-arm to move the latter outwardly, the trip mechanism before described causes the power to be applied to the binding mechanism and disengages the packers. At this stage of the operation the open slots in the plates J and P register, and the plates $S^2$ and $T'$ are away from the plate P and the plate $S^2$ in its farthest position from the plate $T'$. The parts are now in their open position, ready to receive the cord which is brought up from the needle. As the needle or binder-arm ascends, it carries the cord around the bundle, and the end thereof projects outside of the swinging plates $S^2$ $T'$, with the portion of the cord which will be severed by the cutters resting in the rear of the hook $S^4$, and the remaining cord leading to the spool on the convex side of the needle and out of the reach of the cutters and holders. At this juncture the plates P and $S^2$ move rearwardly and the plates $S'$ and $T'$ swing inwardly until the four plates J, P, $S^2$, and $T'$ rest in close contact. The rearward movement of the plate P carries the cord behind the cutter $Q^2$ and carries the cutter $Q^5$ behind the cord, and hence when the plates before mentioned are in their closed position the cord rests between the cutters and in a position to be severed by the next forward movement of the movable cutter. While the plates $S^2$ and $T'$ are moving toward the plate P the jaws of the tying-bill revolve and tie a knot similar to that described in my application filed May 2, 1883, No. 93,800. By causing the plates to move toward the tying-bill while the latter is revolving the surplus twine—that is, the twine between the plates $S^2$ and $T'$ and the plate P—is fed to form the knot, and hence the strain is taken from the main body of the cord and the tension device. As soon as the tying-bill makes one revolution and ties the knot, the plate P begins to move forward and the plates $S^2$ and $T'$ move away from the plate P. This outward movement of the plates $S^2$ and $T'$ tightens the cord outside of the cutters, and enables the cutters to sever the cord without difficulty. At this point in the operation the cord-stripping arm is elevated and the knot withdrawn from between the jaws of the tying-bill. After the bundle is bound, the ejector-arm engages it and moves it from off the platform. After the cord around the bundle has been severed from the main body of the cord, the free end of the latter is still held by the hook $S^4$ and passes outwardly from under the same and then back over it to the needle, and the cord is again in position for another bundle. After the bundle is bound and ejected, the binding mechanism is thrown out of gear and the packers thrown into gear and pack the grain for the next bundle.

The endless chain for moving the grain to the packers can be operated by a chain from the packer-shaft or from any other suitable source, and the mechanism for imparting motion from the master or ground wheel to the whole device can be arranged differently, as desired.

It is evident that numerous slight changes in the construction and relative arrangement of the several parts might be resorted to without departing from the spirit of my invention; and hence I would have it understood that I do not confine myself to the exact construction shown and described, but consider myself at liberty to make such slight changes as fairly fall within the spirit and scope of my invention.

Having fully described my invention, what I claim as new, and desire to secure by Letters Patent, is—

1. In a grain-binding harvester, the combination, with a platform and the main driving-shaft situated above the platform, of a gear-wheel loosely mounted on the main shaft, a combined cam and mutilated gear-wheel, also loosely mounted on said shaft, intermediate devices for locking one of said wheels to the main shaft, packers operated by the gear-wheel, and the binding mechanism operated by the combined cam and gear wheel.

2. In a grain-binding harvester, the combination, with the main driving-shaft, a combined cam and gear wheel loosely mounted thereon, the said wheel being provided with a hub having a crank secured thereto, and mechanism for locking the wheel to the shaft, of a needle or binder-arm shaft having an arm projecting therefrom and a pitman connecting the said arm to the crank on the hub of the wheel, substantially as set forth.

3. In a grain-binding harvester, the combination, with a platform and a standard secured thereto, of a main driving-shaft, a gear-wheel loosely journaled thereon and provided with a toothed hub, a combined cam and mutilated gear-wheel journaled on the said shaft, one end of the hub of said wheel being provided with teeth, while the opposite end thereof passes through the standard and is provided with a crank for operating the needle, and suitable mechanism for locking one of said wheels to the main shaft.

4. In a grain-binding harvester, the combination, with the driving-shaft, combined cam and mutilated gear-wheel for operating the binding mechanism, and the gear-wheel for operating the packers, a sliding sleeve or clutch, and a spring for holding the sleeve in contact with one of the wheels, and a lever secured to the combined cam and gear wheel for moving the sleeve, of a compressor-arm shaft, a crank loosely journaled to the shaft, a spring one end of which is secured to the shaft, while the opposite end is secured to the crank, a stop rigidly secured to the compressor-arm shaft, a trip-lever rigidly secured to the outer end of said shaft, and a lever and pitman connecting the combined cam and gear wheel with the yielding crank, substantially as set forth.

5. In a grain-binding harvester, the combination, with a needle-shaft and a vertically-movable pitman for operating said shaft, the said pitman being provided with a projecting lug, of a compressor-arm shaft provided with a projecting arm, which latter is adapted to come in contact with the lug on the pitman, substantially as set forth.

6. In a grain-binding harvester, the combination, with the main driving-shaft and a combined cam and mutilated gear-wheel mounted thereon, the said wheel being provided with an elongated hub, to which a crank is secured, of a needle-shaft provided with a rigid arm, a pitman connecting the arm with the crank, the said pitman being provided with a lug, and the compressor-arm shaft provided with an arm, which latter is adapted to come in contact with the lug on the pitman, substantially as set forth.

7. The combination, with the main shaft, the combined cam and mutilated gear-wheel loosely journaled thereon, and automatic devices for locking the wheel to the shaft, of a lever engaging the cam-groove of the wheel for operating the compressor-arm, and a shaft provided with a pinion, which latter engages the teeth of the wheel, the said shaft being provided with a bevel-gear for turning the tying-bill, substantially as set forth.

8. The combination, with the combined cam and gear wheel, of a lever engaging the cam-groove of the wheel for operating the compressor-arm, a shaft provided at its front end with a pinion for engaging the teeth of the wheel and at its rear end with a bevel-wheel for operating the tying-bill, and a cam-wheel for moving one of the jaws of the bill toward and away from the other jaw of the tying-bill, substantially as set forth.

9. The combination of a non-sliding shaft having a rigid jaw at one end and a pinion at its opposite end, a movable sleeve encircling said shaft between the jaw and the pinion and provided with a rigid jaw, an arm connected with the sleeve and a rod adjustably connected to said arm and operated by a cam-wheel for reciprocating the rod, and a pinion on the shaft of the cam-wheel for operating the knotter, substantially as set forth.

10. The combination, with the main driving-shaft, and the combined cam and mutilated gear-wheel journaled thereon and provided with a crank, of the shaft L, connected to the crank of the combined cam and gear wheel, the pitman connected to said crank for operating the needle or binder arm, a cam-wheel secured on said shaft L, cord-cutting mechanism operated by said cam-wheel, and the bell-cranked cord-stripping arm pivoted to the machine-frame and operated by the cam-wheel, substantially as set forth.

11. The combination, with a suitable frame, $B^2$, supported by a standard, and the shaft L, journaled in said frame and provided with the cam-wheel $M^2$, of suitable cord-tyer journaled in the frame $B^2$, the face-plate of which latter is provided with a slot and a hook-shaped cutter, the plate P, situated alongside of the face-plate of the frame and provided with a slot and a hook-shaped cutter, and a pivoted lever connecting the cam-wheel $M^2$ and the plate P, whereby the latter is moved longitudinally, substantially as set forth.

12. The combination, with a cord-knotter and cord-cutting devices, of a swinging cord-holder acting in conjunction with the non-swinging cutters, devices for opening and closing the jaws of the cord-holder, devices for opening and closing the jaws of the cutters, and a device for swinging the cord-holding jaws toward and away from the cord-cutting jaws, substantially as set forth.

13. The combination, with a knot-tyer and devices for operating the same, of the shaft L, located above the tyer, the cam $M^2$, secured on said shaft, stationary and sliding cord-cutting jaws, a lever connecting the cam and sliding cutting-jaw, and cord-holding devices, substantially as described, connected to and operated by said sliding cutting-jaw, substantially as set forth.

14. The combination, with the shaft L, having the cam-wheel M² rigidly secured thereto, and a suitable tying-bill, of the plate J, the plate P, provided with the cord-guiding arm, and the pivoted lever connecting the cam-wheel and plate P, whereby movement is imparted to the latter, substantially as set forth.

15. The combination, with the shaft L and the cord-holding plates S² T', loosely journaled thereon, of the stationary plate J, provided with a cutter, the plate P, provided with a cutter, the cam-wheel mounted on said shaft, a lever connecting the cam-wheel and plate P, a bar connecting said plate P and one of the cord-holding plates for moving said cord-holding plate longitudinally, and devices for moving both cord-holding plates laterally, substantially as set forth.

16. The combination, with the shaft L, a cam-wheel thereon, and cord-cutters, of the swinging plate T', provided with a groove and a shoulder, and the sliding and swinging plate provided with a hook, which latter moves in the groove of the plate T', devices indirectly connecting the plate S² with the cam-wheel for moving said plate longitudinally, and a device engaging one of said plates for moving both plates laterally, substantially as set forth.

17. The combination, with a plate provided with a rigid cutter and a movable plate having a cutter thereon, of a swinging plate, T', provided with a groove, a swinging plate, S², provided with a cord-holding hook, which latter moves in the groove, and an arm rigidly secured to the movable cutter-plate and engaging the plate S², whereby the latter is moved longitudinally simultaneously with the movable cutter-plate, substantially as set forth.

18. The combination, with a rigid plate provided with a cutter, and a movable plate provided with a cutter, and with a guiding-bar, inclined as shown, of cord-holding devices provided with the lug T⁵, whereby the said latter devices are moved toward and away from the cutters, substantially as set forth.

19. The combination, with a cord-knotter, of a cord-guiding arm, stationary and movable cutting-jaws located behind the cord-knotter, cord-holding devices located behind and operated by the sliding cutting-jaw, and a cord-clearing arm rigidly secured to the sliding cutting-jaw, all of the above parts combined substantially as set forth.

20. The combination, with suitable cord tying, holding, and cutting mechanism, of the shaft L, situated above said mechanism and provided at its rear end with a rigid ejector-arm, which latter is curved or bent toward the center of the shaft so that its free end strikes the center of the bundle while ejecting the latter, substantially as set forth.

In testimony whereof I have signed this specification in the presence of two subscribing witnesses.

ALVIN O. CARMAN.

Witnesses:
　JERRIE MIKESELL,
　GEO. A. PERRY.